US006632027B1

United States Patent
Yoshida et al.

(10) Patent No.: US 6,632,027 B1
(45) Date of Patent: Oct. 14, 2003

(54) OPTICAL MODULE

(75) Inventors: Kouji Yoshida, Kokubunji (JP);
Masato Shishikura, Hachioji (JP);
Toshinori Hirataka, Yokohama (JP);
Shinji Tsuji, Hidaka (JP); Takeshi Kato, Akishima (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/363,831

(22) Filed: Jul. 30, 1999

(30) Foreign Application Priority Data

Aug. 1, 1998 (JP) .......................... 10-230234

(51) Int. Cl.[7] .............................. G02B 6/36
(52) U.S. Cl. ......................... 385/88; 385/94
(58) Field of Search ................. 385/88–94, 14, 385/47, 49, 51, 1–9; 428/1

(56) References Cited

FOREIGN PATENT DOCUMENTS

JP          6-252335          9/1994

OTHER PUBLICATIONS

The Journal of Japan Institute of Interconnection and Package Electronics Circuits, vol. 10, No. 5, 1995, pp. 302–305, 320–329.

Primary Examiner—Frank G. Font
Assistant Examiner—Michael P. Mooney
(74) Attorney, Agent, or Firm—Mattingly, Stanger & Malur, P.C.

(57) ABSTRACT

An optical module shown in FIG. 2 is disclosed having following components.

(1) A substrate on which optical parts and an optical fiber are mounted. An optical fiber is fixed in the V-groove formed on the substrate so that the optic axis of the optical parts and the fiber is adjusted.

(2) A bottom plastic package having a concave surface for the substrate mounted thereon and several leads pins being fixed to the first plastic package.

(3) A upper plastic package for sealing optical parts and the fiber being fixed to the bottom plastic package, the outer surface of the upper plastic package being plated by metal, and the upper plastic package and at least one of the lead pins conducted.

According to this, it is possible to provide optical transmission module or optical module having advantage of capable of using plastic package and electromagnetic interference free with simplified structure.

11 Claims, 5 Drawing Sheets

OPTICAL MODULE

BACKGROUND OF THE INVENTION

The present invention relates to an optical module and more particularly, the optical module that is useful in cost reduction and improvement of reliability.

Recently, it is strongly required to reduce the cost of an optical module to realize the optical subscriber network. To answer the requirement, a lot of studies have been reported for simplifying the alignment process between an optical device and an optical fiber and decreasing number of the parts of an optical package. In connection with this, for example, in "The Journal of Japan Institute for Interconnecting and Packaging Electronic Circuits, Vol. 10, No.5, pp302–305 and pp325–329 (1995), it is described passive alignment and packaging technology for optical devices.

Optical receiver modules are key devices in the optical communication system. It is composed of several components such as optical semiconductor devices, an optical fiber and/or an optical waveguide, lens for the optical coupling, electronic devices, substrate, lead pins, and package.

Regarding the packaging, the hermetic sealed metal or ceramic package is described in "The Journal of Japan Institute for Interconnecting and Packaging Electronic Circuits, Vol. 10, No.5, pp320–324 (1995)". The MCF (Multilayer Ceramic Frame) package that has both good frequency response equal to metal package and mass productivity equal to ceramic package is also described.

The plastic resin package is expected to be the substitution of these packages because the plastic package is suitable for low cost mass production, but the plastic package has high transmission of moisture, which is general weak point nevertheless. To improve the problem, the encapsulation with transparent organic materials or grass lid covering of optical semiconductor devices have been proposed as simple sealing methods.

However, the plastic package has another weak point; the package is more transmissive to electromagnetic wave than that of metal package and ceramic package, and is more sensitive to EMI (Electromagnetic Interference). Though the problem can be improved by attaching electromagnetic shield to the module, the conventional sealing method with wholly covered metal is not suitable for practical use, because the cost is high. Therefore, it is the subject to realize electromagnetic sealing keeping the plastic package's advantage in low cost.

SUMMARY OF THE INVENTION

It is an object of the present invention to provide an optical module with plastic package and to improve the problem of the electromagnetic interference.

It is another object of the present invention to provide an optical module having simple structure and to improve the problem of the electromagnetic interference.

The present invention has invented by paying an attention to the point that lead frame is a component of an optical module. Lead frame is a thin metal plate and composed of the plate on which devices and a substrate are mounted and lead pins for input/output the electric signal. Lead frame has the function of holding a substrate, heat radiation, and connector. The invented optical module is using the lead frame as a part of electromagnetic shielding.

The object of our invention can be achieved by using an optical module comprising a lead frame molded by the first resin molded part, a substrate mounted on the lead frame with optical devices, the second resin molded part (the substrate is sealed by the first and second resin molded part.) and a electric conductive parts connected with the lead frame covering the substrate. According to the structure, the optical parts in the module are covered with the lead frame and the conductive parts; therefore, the optical parts are electromagnetic shielded. According to the invention, an optical module using plastic package and with electromagnetic interference free can be obtained.

Although metal parts, which provided between the first and the second packages, are useful for conductive parts, and, for example, metal plating layer formed on the second package is also useful for it. Moreover, fabricated conductive metal parts, which provided in inside of the second package and a fabricated conductive metal parts in order to cover outside of the second package are also useful.

The above object also can be achieved by using an optical module comprising a lead frame molded by the first resin encapsulating package, a substrate mounted on the lead frame, optical devices mounted on the substrate, and electric conductive parts connected with the lead frame. The substrate is inserted between the first resin molded package and the conductive parts. In the case, the conductive parts have the function of the second resin-molded package. The conductive parts are adjacent to a fiber holding component.

Moreover, the optical module of the present invention also has at least a lead frame, a substrate mounted on the lead frame, an optical module mounted on the substrate, a conductive parts electrically connected with the lead frame and covering or packing the substrate, and a resin molded package which molds at least the substrate and the conductive parts. Bending part of the lead frame can make the conductive parts.

The optical module of the present invention is manufactured by following steps: mounting optical devices on a substrate, mounting the substrate on the lead frame molded by the first resin molded package, covering the optical device with transparent resin, and fixing the second package having a conductive parts to the first package. The following method is also useful: mounting an optical device on a substrate, mounting the substrate on the lead frame, connecting a conductive parts for covering the substrate to the lead frame, and molding at least the substrate and the conductive parts.

According to the constitution described above, the optical module having plastic package, characteristics of electromagnetic interference free, and simple structure can be obtained.

DESCRIPTION OF THE PREFERRED EMBODIMENTS

Figure 1:
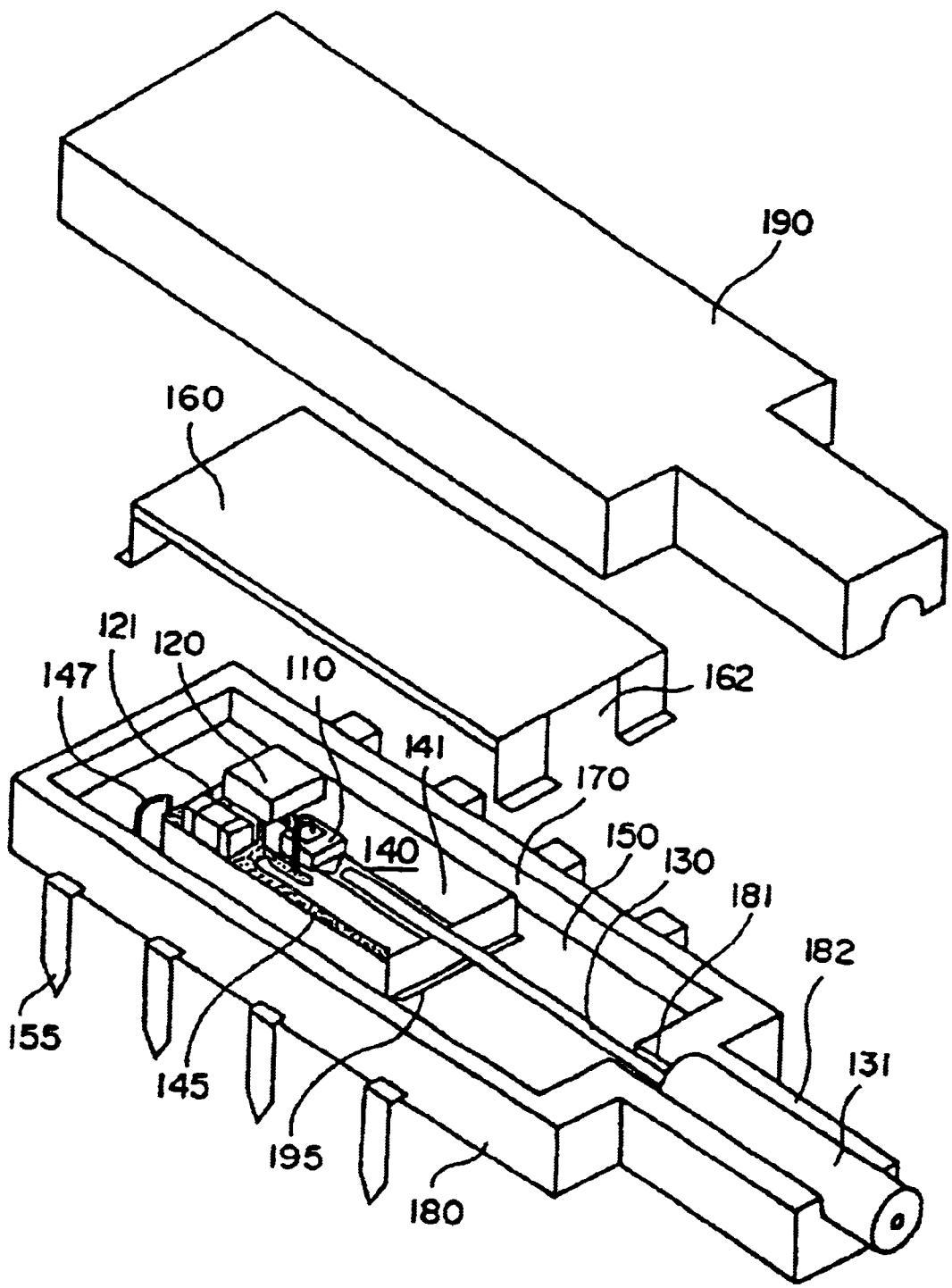
FIG. 1 shows a bard view of the first embodiment of an optical module of the present invention.

FIG. 1 shows a bard view of the first embodiment of an optical module of the present invention. This figure also shows an exploded view for easy to understand the inside appearance. The module has at least optical device 110, a preamplifier 120, a capacitor 121, an optical fiber 130, a substrate with a V-groove 140, a lead frame 150, conductive material parts 160, a transparent resin 170 which fills into space of a bottom plastic package 180, and a upper plastic package 190 which is used as a upper lid to the bottom plastic package 180. The lead frame 150 is resin-molded and composed of the bottom plastic package 180. The bottom plastic package 180 is constituted as a dual in-line package (DIP) having 8 outer lead pins. The bottom and the upper packages 180, 190 have an outer length of 14.6 mm (The length includes an outer length of 5 mm of the fiber holder part.), an outer width of 6.3 mm, and a height of 3 mm.

Each one of the optical device 110 and the preamplifier 120 are die-bonded to the substrate 140. The optical fiber 130 is fixed by adhesive to the V-groove 141 of the substrate 140, and coupled to the optical device 110. The transparent resin 170 covers at least on the optical device 110, the preamplifier 120, and one end of the optical fiber 130.

The optical assembly consists of the substrate 140, optical device 110, preamplifier 120 and the fiber 130 are mounted on the plastic package 180 as shown in FIG. 1. The lead frame 150 is fabricated in the plastic package 180. The bottom plastic package 180 is constituted as a dual in-line package (DIP) having 8 outer lead pins. The substrate 140 is fixed on the lead frame 150 by the conductive adhesive 195. The lead frame 150 is connected to the terminal for ground, and for example, bonding wire 147 led from the optical assembly is connected to another lead terminal. The optical fiber with and without cover 131, 130 is fixed to U-groove 181 and 182 formed on the bottom plastic package 180 respectively.

The conductive metal parts 160 are fixed to the lead frame 150 by conductive epoxy resin so that the substrate 140 is covered with the parts 160 for electromagnetic shielding. The conductive metal parts 160 have the opening 162 for lo the fiber 130. The conductive metal parts 160 also have the two side-openings for avoiding the bonding wire 147. The bottom plastic package 180 and the lead frame 150 electro-magnetically shield the optical assembly. The bottom and the upper packages 180, 190 are fixed by epoxy resin. Further, the bottom package 180 and lead flame 150 are fixed by epoxy resin with high conductivity.

For example, an optical waveguide type photodiode-having InP based semiconductor can be used as the optical device 110. Alignment markers (not shown) to align to the substrate 140 are formed on the surface of the junction side of the optical device 110. For example, Au-Sn is used for die-bonding the optical device 110 to the substrate 140. A thickness of Au-Sn soldering layer is 3~5 μm, and it is adjusted so that the height of the absorption layer of the optical device 110 from the surface of the substrate 140 becomes 8–10 μm. A single mode glass fiber is used as the fiber 130 whose outer diameter is 125 μm and spot size is 5 μm.

The substrate 140 is constituted by of silicon which has {100} crystal surface. The substrate 140 has the V-groove 141 for high precision alignment of the fiber 130 and the optical device 110, and a wiring layer 145 to connect the optical device 110 to outer devices. More, the substrate 140 has markers (not shown) in a position that the optical device 110 should be fixed. The alignment can be carried out preciously using both the markers of the substrate 140 and the optical device 110. The side of the V-groove 141 and the marker is constituted by {111} of crystal surface and these surfaces are formed at a time using KOH solution and orientation dependent anisotropic etching method. A width of the V-groove is 138–143 μm and the V-groove is formed so that the height of the optical axis of tip of the fiber 130 measured from the surface of the substrate 40 is equal to the height of the active layer and the absorption layer of the optical device 110.

The wiring layer 145 is made of, for example, Au/Pt/Ti film layer or Au/Ni/Cr film layer and is formed by evaporation method on surface of insulating layer formed on the substrate 140. Although, in FIG. 1, the wiring layer pattern is shown as a simplified sketch, width and thickness of the wiring 145 and thickness of the optical device 110 are determined by considering load capacitance of the optical device 110. The silicone resin is used for this transparent resin 170. The transparent resin 170 is filling the optical device 110 and the optical fiber 130 and adheres to them. The reflective index of the transparent resin 170 is 1.4 at wavelength of 1.3 μm, and it is almost adjusted to reflective index of the fiber 130. If it is required higher reliability, the transparent resin 170 must be filled all over the optical fiber 130. Thermoplastic resin, for example, liquid crystal polymer(LPC) is used as a material of the bottom and the upper packages 180, 190.

A manufacturing process of the optical module of the first embodiment is summarized as follows: (1) the markers formed on the optical device 110 and substrate 140 are detected by using imaging device with infrared light and then, alignment is carried out between them. (2) A load is put on the optical device 110 and pre-bonds it to the preheated substrate 140. (3) Die-bonds the optical device 110 to the substrate 140 by reflowing the Au-Sn solder. (4) Preamplifier 120 is fixed to the substrate 140 by adhesive. (5) Wire bonding the optical device 110, preamplifier 120 to the wiring layer 145 of the substrate 140. (6) The substrate 140 is fixed to the lead frame 150 using epoxy resin 195 with conductivity and high thermal conductivity. (7) The optical fiber 130 is fixed to the V-groove 141 by ultraviolet ray hardening resin. (8) The boxy conductive metal parts 160 formed by press manufacturing is fixed to the lead frame 150 using epoxy resin 195 with conductivity and high thermal conductivity. (9) The transparent resin 170 is dropped down on the optical device 110 and the optical fiber 130 and they are heat hardened. (10) The bottom and the upper packages 180, 190 are fixed each other by filling between them with epoxy resin.

According to the embodiment, low cost optical module is obtained by constituting dual in-line package and using the lead frame as a part of the maintaining electromagnetic shield.

Figure 2:
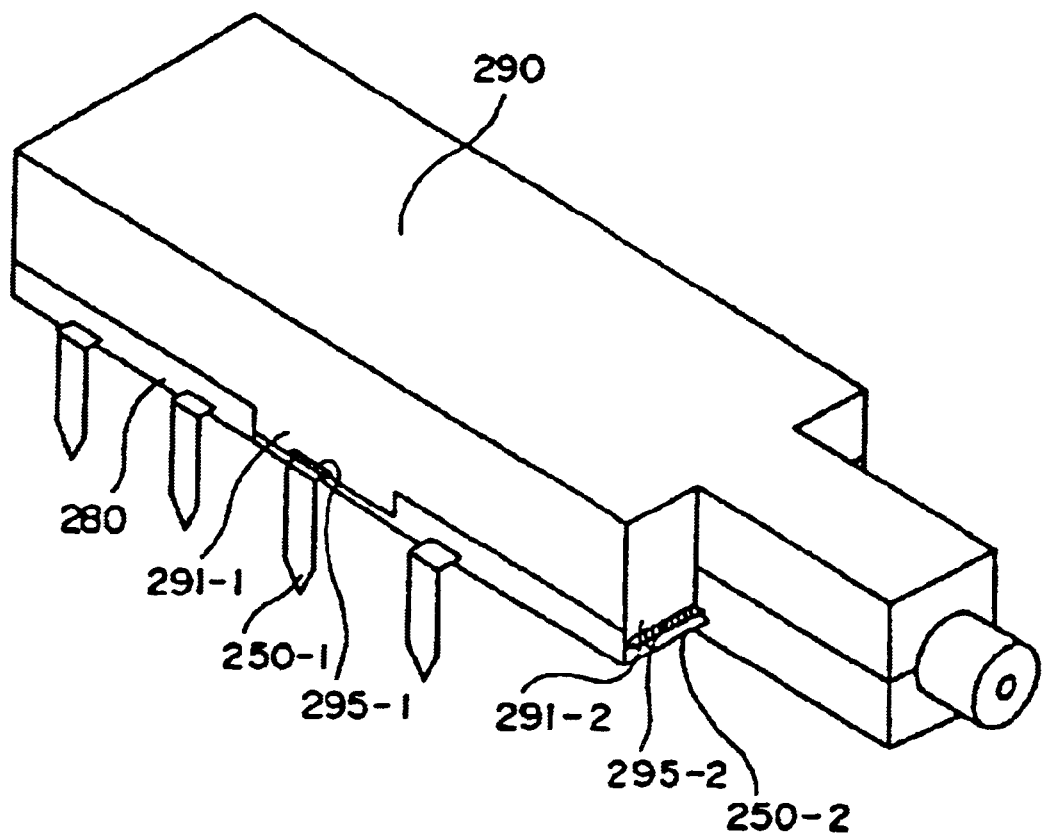
FIG. 2 shows a bard view of the second embodiment of an optical module of the present invention.

FIG. 2 shows an optical module of second embodiment of the present invention. Internal structure of package of this embodiment is similar to that of first embodiment with the exception of that the second embodiment does not have the conductive metal parts 160 of FIG. 1. In this embodiment, thermoplastic resin that is possible to plate, for example, liquid crystal polymer is used as material of the bottom and the upper packages 280, 290. Copper plating for electro-magnetic shielding and Nickel plating for prevention of oxidization is carried out to the upper package 290 surface by using electroless plating method. The copper plating is not required to the bottom package 280 because the lead frame of the bottom package 280 has the function of electromagnetic shielding.

As shown in FIG. 2, electric connecting part 291-1 is provided at the upper package. It is connected to a lead pin for the ground 250-1 with conductive adhesive 295-1. By using this structure, it is possible to electrically connect the upper package 290 to the lead frame 150. Another structure for electric connection between them is also shown in FIG. 2. Extending the die-pad of the lead frame forms the expanded part 250-2, and it is electrically connected to the corresponding part 291-2 of the upper package 290 using the conductive adhesive 295-2. By using these structures, insulation of the other lead pins used as power supply line or signal line can be maintained easily because these pins are not electrically connected with the upper package 290. Because the gap between these pins and the top part of the bottom package 280 is not more than 2 mm, there is durability against electromagnetic noise up to about 2–3 GHz. Adhesive of epoxy thermal hardening resin type is used for connecting between the bottom and upper package 280, 290 except for the part of the electric connection.

In this embodiment, it is possible to maintain electromagnetic shielding by metal plating to the upper package and the lead frame 150, therefore, the optical module becomes low cost.

Figures 3A, 3B, 3C:
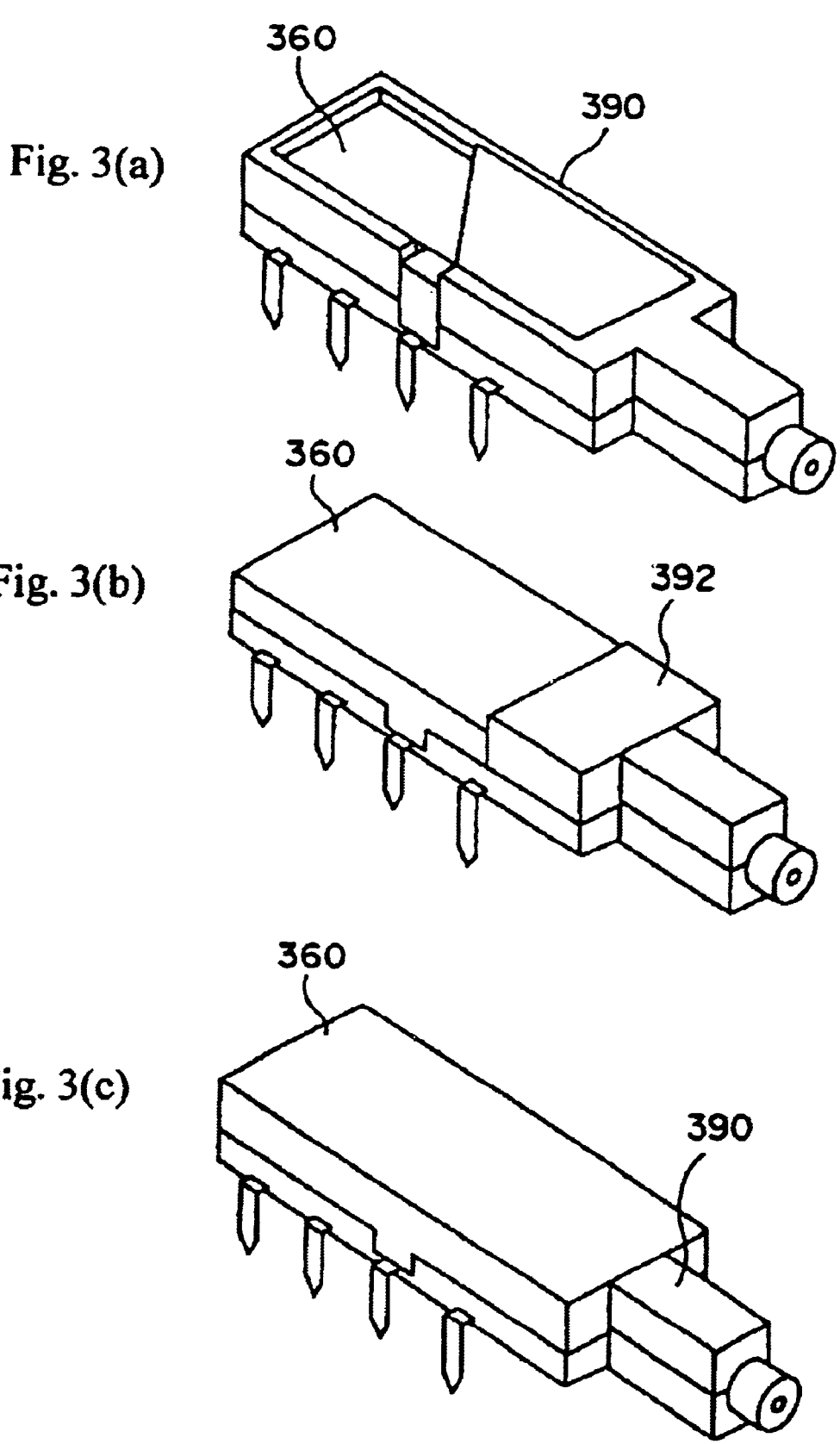
FIGS. 3(a)–(c) shows a bard view of the third to fifth embodiments of optical modules of the present invention.

FIGS. 3(a)–(c) shows optical module as the third to the fifth embodiments of the present invention. In the third embodiment, as shown in FIG. 3(a), instead of using metal plating in the second embodiment, boxy conductive metal parts 360 formed by press manufacturing is insert-fabricated into upper package 390. The figure shows the structure by showing cross sectional view of the part of the upper package 390. The other structural feature is similar to that of the second embodiment.

In the forth embodiment, as shown in FIG. 3(b), instead of using metal plating in the second embodiment, it is constituted that the substrate 140 is covered by the boxy conductive metal parts 360 formed by press manufacturing. A component 392 is provided next to the conductive metal parts 360. The component 392 is made of plastic and has a U-groove for holding an optical fiber. The optical fiber is sandwiched between the component 392 and the bottom package. The other structural feature is similar to that of the second embodiment.

In the fifth embodiment, as shown in FIG. 3(c), instead of using the metal plating parts in the second embodiment, the boxy conductive metal parts made using press manufacturing method 360 is used. The parts 360 are mounted on a bottom package. It is possible to maintain electromagnetic shielding according to the parts 360 and electric contact between the pins of the lead frame 150 and the parts 360. The other structural feature is similar to that of the second embodiment.

In the third to fifth embodiments, it is possible to maintain electromagnetic shielding by the boxy conductive metal parts 360 formed by press manufacturing method and electric contact between the pins of the lead frame 150 and the parts 360. Therefore, the low cost optical module can be achieved.

Figure 4:
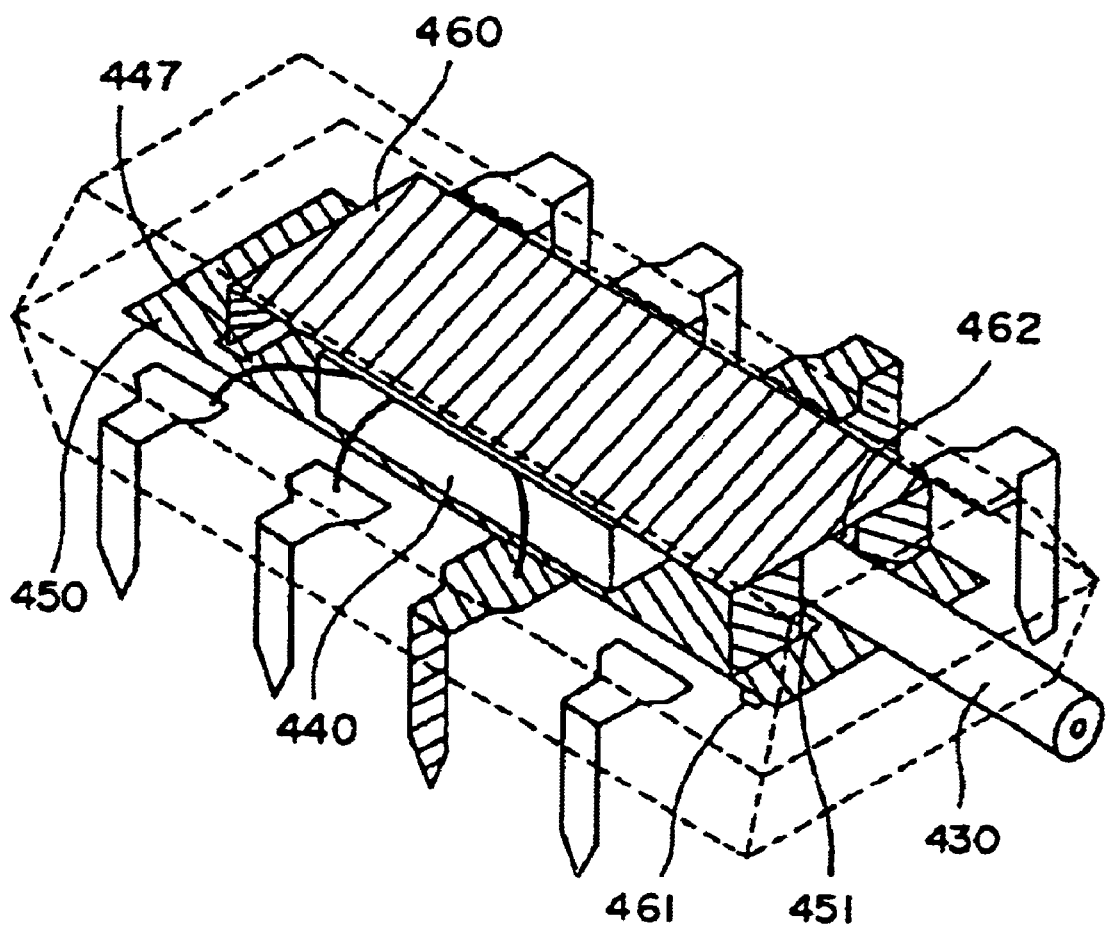
FIG. 4 shows a bard view of the sixth embodiment of an optical module of the present invention.

In the sixth embodiment, as shown in FIG. 4, the boxy or semi-boxy conductive metal parts 460 formed by press manufacturing are electrically fixed to a lead frame 450 so that the parts 460 do not contact with bonding wires 447 and the substrate 440 is covered with the parts 460. In this embodiment, the lead frame 450 has projecting parts 461 and holes 451 so that tips of the part 460 are inserted into the holes 451 and the tip is bent for fixing the parts 460 to the lead frame 450. This structure has advantage of strengthening mechanical joining between the lead frame 450 and the parts 460.

The package of the present embodiment has the shape shown by dashed line of FIG. 4 and is manufactured by using lump fabrication method, for example, transfer mold method. The metal parts 460 has openings 462 in front and behind portion to avoid interference with the optical fiber 430 and smooth the way for the flow of the mold resin as package material. Though the embodiment shown in FIG. 4 explaining a package using a lump fabrication method, the same method can be generally applied to a package using lead frame fabricated conductive metal.

Figure 5:
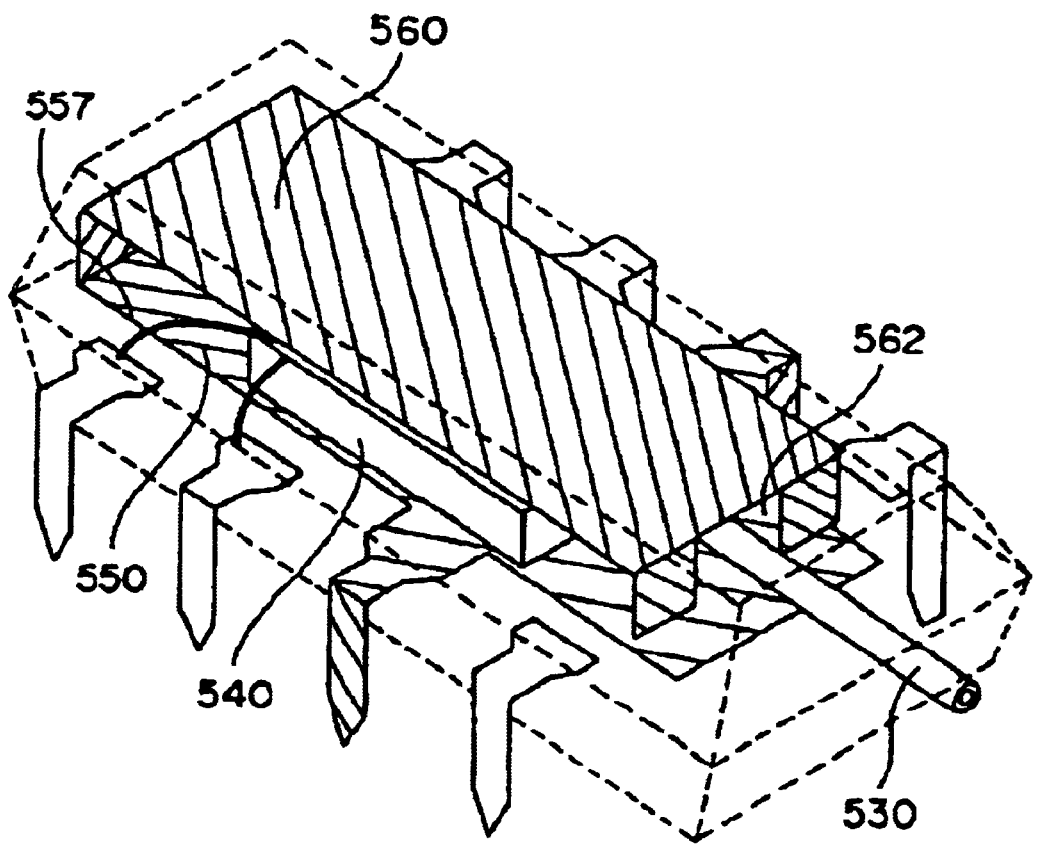
FIG. 5 shows a bard view of the seventh embodiment of an optical module of the present invention.

In the seventh embodiment, as shown in FIG. 5, one part of the lead frame 550 is used as conductive metal part 560 to cover substrate. The part 560 and the lead frame 550 are in a body. This is manufactured by mounting substrate 540 and optical fiber 530 on the lead frame 550 and then, bending the lead frame 550. In this embodiment, it has advantage of improvement of the ground because the part 560 and the lead frame 550 are in a body.

The package of the present embodiment has the shape shown by dashed line of FIG. 5, is similar to that of the sixth embodiment, and is manufactured by lump fabrication method, for example, transfer mold method. The part 560 has openings 562 in front and behind portion to smooth the way for the flow of the mold resin. Though the embodiment shown in FIG. 5 explaining a package using a lump fabrication method, the same method can be generally applied to a package using lead frame fabricated conductive metal.

The advantages of these embodiments are providing optical module manufactured using plastic package capable of satisfying requirement of lowering cost and having durability against electromagnetic noise with simplified assembling process. Therefore, it is possible to achieve lowering cost and high reliability by the embodiments.

According to the invention, it is possible to provide optical module using plastic package with high durability against electromagnetic interference by simplified structure.

What is claimed is:

1. An optical module comprising:
  (1) a substrate, on which optical parts and an optical fiber are mounted, V-groove formed on the substrate, and the end part of the fiber placed on the V-groove so that the optic axes of the optical parts and the fiber are adjusted;
  (2) a first resin molded plastic package having a concave surface for the substrate mounted thereon, and several lead pins fixed to the first plastic package;
  (3) an electric conductive metal parts electrically connected to a lead frame molded by the first plastic package and covering the substrate; and
  (4) a second plastic package for sealing the optical parts, the electric conductive metal parts, and the fiber mounted on the substrate.

2. An optical module comprising:
  (1) a substrate, on which optical parts and an optical fiber are mounted, V-groove formed on the substrate, and the end part of the fiber placed on the V-groove so that the optical axes of the optical parts and the fiber are adjusted;
  (2) a first plastic package having a concave surface for the substrate mounted thereon, and several lead pins fixed to the first plastic package;
  (3) a second plastic package for shielding the optical parts and the fiber mounted on the substrate, and the outer surface of the second plastic package plated by metal; and
  (4) the second plastic package and a lead pin connected electrically.

3. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a first plastic package having a concave surface for the substrate mounted thereon, and several lead pins fixed to the first plastic package;
(3) a second plastic package for shielding the optical parts and the fiber mounted on the substrate, and the inner surface of the second plastic package plated by metal; and
(4) the second plastic package and the lead pin connected electrically.

4. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a first plastic package having a concave surface for the substrate mounted thereon, and several lead pins fixed to the first plastic package;
(3) a second plastic package for shielding the optical parts and the fiber, and the second plastic package having conductivity; and
(4) the upper plastic package and the lead pin connected electrically.

5. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a bottom plastic package having a concave surface for the substrate mounted thereon, and several lead pins fixed to the first plastic package;
(3) a upper plastic package for shielding the optical parts and the fiber, and surface of the second plastic package having conductivity; and
(4) the upper plastic package and a lead pin connected electrically.

6. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a bottom plastic package having a concave surface for the substrate mounted thereon, and several lead pins fixed to the first plastic package;
(3) an upper plastic package for shielding the optical parts and the fiber, and the surface of the upper plastic package having conductivity;
(4) an electric connecting part provided at the upper package, which extended to the outer part thereof; and
(5) the upper plastic package and a lead pin connected electrically.

7. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a bottom plastic package having a concave surface for the substrate mounted thereon, and lead frame molded in the bottom plastic package;
(3) an upper plastic package for shielding the optical parts and the fiber, and surface of the upper plastic package having conductivity;
(4) a first electric connecting part of the upper package, which projected to the outer part thereof;
(5) a second electric connecting part provided so that the lead frame is extended to out of the bottom package; and
(6) the first and the second electric connecting parts connected electrically each other.

8. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a bottom plastic package having a concave surface for the substrate mounted thereon, and several lead pins fixed to the bottom plastic package;
(3) an upper conductive metal package for shielding the optical parts and the fiber;
(4) a boxy conductive metal parts insert-fabricated into the upper package; and
(5) the boxy conductive metal parts and a lead pin connected electrically.

9. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a bottom plastic package having a concave surface for the substrate mounted thereon, and several lead pins fixed to the bottom plastic package;
(3) a upper conductive metal package for shielding the optical parts and the fiber; and
(4) the upper conductive metal package and a lead pin connected electrically.

10. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a boxy or a semi-boxy conductive metal parts fixed to a lead frame so that the substrate is covered with thereof, having a projection parts and a hole so that tips of the projection parts are inserted into the holes and the tip is bent for fixing the projection parts to the lead frame; and
(3) a resin molded plastic package for sealing the substrate and the boxy or the semi-boxy conductive metal parts.

11. An optical module comprising:
(1) a substrate, on which optical parts and an optical fiber are mounted, V-groove formed on the substrate, and the end part of the fiber placed on the V-groove so that the optical axes of the optical parts and the fiber are adjusted;
(2) a lead frame, on which the substrate is mounted, and part of the lead frame is bent backwards so as to cover the substrate and the optical parts; and
(3) a resin molded plastic package for sealing the substrate and the lead frame.

* * * * *